United States Patent [19]

Little

[11] 4,276,506
[45] Jun. 30, 1981

[54] MOTOR CONTROL CIRCUIT

[75] Inventor: Hercel A. Little, Hampton, Minn.

[73] Assignee: Chore-Time Equipment, Inc., Milford, Ind.

[21] Appl. No.: 53,330

[22] Filed: Jun. 29, 1979

[51] Int. Cl.³ .............................................. H02P 5/40
[52] U.S. Cl. .................................... 318/806; 318/812; 318/313; 318/480
[58] Field of Search ................ 318/313, 480, 806, 812

[56] References Cited

U.S. PATENT DOCUMENTS

| | | | |
|---|---|---|---|
| 3,539,892 | 11/1970 | Lindberg | 318/806 |
| 3,613,391 | 10/1971 | Harter | 318/806 X |
| 3,697,863 | 10/1972 | Kilner | 318/806 X |
| 4,078,393 | 3/1978 | Wills | 318/806 X |
| 4,093,899 | 6/1978 | Denny | 318/806 X |

*Primary Examiner*—Gene Z. Rubinson
*Attorney, Agent, or Firm*—Trexler, Wolters, Bushnell & Fosse, Ltd.

[57] ABSTRACT

A motor control circuit controls the speed of a single-phase split capacitor or shaded pole electric motor, and permits operation of the motor over a wide range of speeds without stalling. A first gated bilateral switch such as a triac is connected in series with the motor, and is fired by an integrating circuit through a second bilateral switch such as a diac. The integrating circuit charges through the start winding of the motor and a potentiometer which adjusts the rate of charging of the integrating circuit for the minimum speed setting desired. The motor control circuit also includes a temperature sensing bridge which becomes unbalanced as a function of increasing temperature. A light emitting diode connected to the bridge emits light as a function of the unbalance of the bridge. A charging circuit is provided which supplies additional charging current to the integrating circuit, and includes photosensors which vary the amount of charging current supplied to the integrating circuit as a function of the light received from the light emitting diode. As the amount of charging current is varied, the rate of charging of the integrating circuit varies, and the diac and triac are triggered earlier in each half cycle of the AC input voltage. Earlier triggering of the motor in each half cycle causes the motor to run at a faster speed.

17 Claims, 1 Drawing Figure

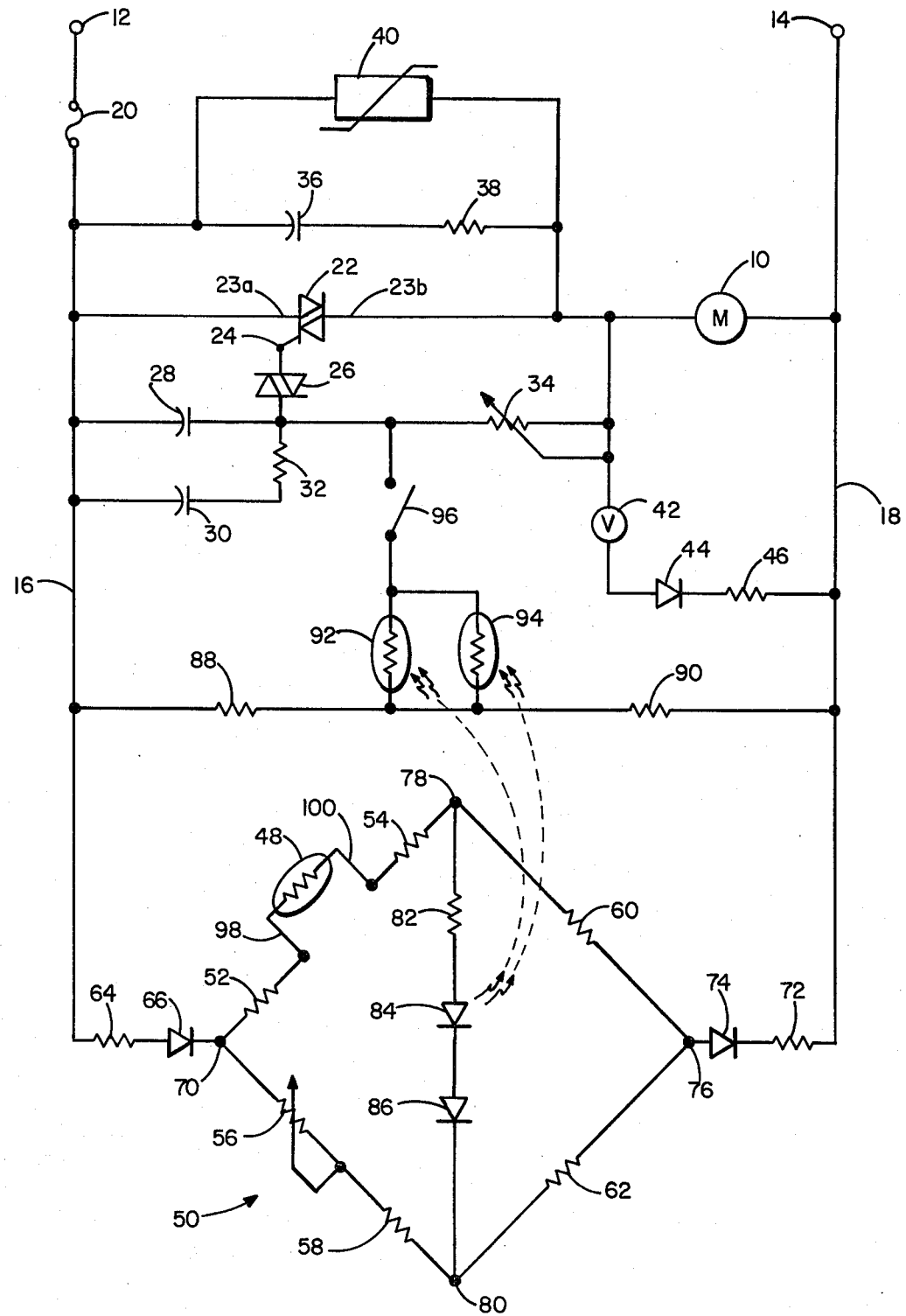

MOTOR CONTROL CIRCUIT

BACKGROUND OF THE INVENTION

1. Field of the Invention

The present invention relates to controls for controlling the speed of AC electrical motors.

2. Description of the Prior Art

One common type of speed control for AC electric motors involves the use of a gated bilateral switch such as a triac which is connected in series with the motor. The triac may be triggered or gated at different phase angles of each half-cycle of the input AC line voltage in order to vary the voltage applied to the motor and therefore the motor speed.

In many applications, it is desirable to be able to control the speed of an electric motor over a wide range of speeds. One such application is in fan control systems for controlling temperature in a commercial confined stock growing operation for raising livestock such as hogs. In typical operations, the animal waste drops through the floor and into a pit below the floor. Constant ventilation must be maintained at a low speed so that the methane gas generated by the animal waste is dissipated, and does not endanger the livestock. As temperature increases in the building, fan speed should increase to increase ventilation and help reduce the temperature. In this type of system, therefore, the electric motor driving the fan must operate at a constant, very low speed under most conditions, but must be capable of much higher speeds depending upon the temperature.

One problem which has been encountered with prior art system phase angle firing motor controls is that there has been a tendency of the electric motors (particularly permanent split capacitor or shaded pole single-phase motors) to stall at low speed as the temperature increases. This is clearly undesirable, since it limits severely the range of voltages and speeds over which the motor may operate. In systems of the type described above, operation over a wide range of speeds without stalling is a necessity.

Another problem with the prior art motor control circuits has been encountered when the temperature sensor was remotely located with respect to the remainder of the circuit. There has been an increasing tendency of the motor to stall, and this tendency appears to be affected by the length of the leads running from the temperature sensor to the remainder of the control circuit. In many applications, it is highly desirable to position the temperature sensor in a remote location with respect to the motor control circuit and the motor. Limitations on sensor lead length severely limit the usefulness of the motor control circuit.

SUMMARY OF THE INVENTION

The present invention is a motor control circuit which controls speed of the motor over wide ranges without stalling. The control circuit includes a gated bilateral switch means such as a triac connected in series with the motor, an integrating circuit means, and a bilateral switch means such as a diac which is connected to the integrating circuit means and a gate electrode of the gated bilateral switch means. The phase angle at which the gated bilateral switch means receives a signal at its gate electrode is dependent upon the charging rate of the integrating circuit means.

The motor control circuit also includes a condition responsive circuit, such as a bridge circuit which provides an unbalance signal which is a function of a sensed condition, such as temperature. Light emitting means is connected to the bridge circuit, and provides a light output which is a function of the signal imbalance. A charging circuit including photosensing means senses light emitted by the light emitting means and supplies a charging current to the integrating circuit which is a function of the light received. The additional charging current supplied by the charging circuit causes the integrating circuit means to charge at a faster rate, thereby changing the phase angle at which the gated bilateral switch mens is fired, and increasing the speed of the motor.

BRIEF DESCRIPTION OF THE DRAWINGS

The FIGURE shows an electrical schematic diagram of the motor control circuit of the present invention.

DETAILED DESCRIPTION OF THE PREFERRED EMBODIMENTS

The motor control circuit of the present invention, as shown in the FIGURE, controls the speed of a single phase permanent split capacitor or shaded pole electric motor 10. Although in the FIGURE motor 10 is shown as a single electric motor, in successful embodiments of the present invention a plurality of electrical motors have been connected in parallel and have been controlled simultaneously by the motor control circuit.

First and second input terminals 12 and 14 of the motor control circuit receive the AC line voltage, which in one preferred embodiment is 230 volt single-phase AC power. The circuit also includes first and second main conductors 16 and 18 between which the components of the motor control circuit, and motor 10 are connected. Fuse 20 is connected between first terminal 12 and first conductor 16 to provide protection for the electronic components of the circuit. Second conductor 18 is connected directly to second terminal 14. A bilateral gated switch, such as triac 22, has its main current carrying electrodes 23a and 23b connected in series with motor 10 between first and second conductors 16 and 18. Triac 22 also has a gate electrode 24 which must receive a gate signal in order to trigger triac 22 into a conductive state and permit current to flow through the series circuit including triac 22 and motor 10. Once triggered, triac 22 continues to conduct until the voltage across electrodes 23a and 23b reaches zero, which of course occurs at the end of each half-cycle of the AC line voltage.

The triggering circuit for triac 22 includes a bilateral semiconductor switch such as diac 26 and an integrating circuit which includes capacitors 28 and 30, resistor 32, and potentiometer 34. During each half-cycle, the integrating circuit charges until the voltage across diac 26 triggers diac 26, and thereby applies a gate signal to gate electrode 24 of triac 22. Selection of the minimum motor speed is made by adjusting potentiometer 34, which varies the rate of charging of the integrating circuit.

At minimum speed conditions, capacitors 28 and 30 are charged through potentiometer 34 and windings of motor 10 during each half-cycle of the AC line voltage until the voltage across diac 26 is sufficient to fire diac 26. The firing of diac 26 applies a trigger pulse to gate electrode 24 of triac 22, thereby turning on triac 22. In the embodiment shown in the FIGURE, capacitors 28 and 30 and resistor 32 are used as part of the integrating circuit to ensure a sufficiently long trigger pulse to gate electrode 24. This is particularly important at very low speeds so that triac 22 is properly triggered.

Capacitor 36 and resistor 38 are connected across triac 22 and form a commutation circuit for turn-off of triac 22. Varistor 40 is also connected across triac 22. The purpose of varistor 40 is to eliminate transients. For example, if transients appear in the AC line voltage, varistor 40 prevents those transients from adversely affecting triac 22. Conversely, if the switching of triac 22 could otherwise cause transients on the line which may adversely affect other electrical equipment, these transients are eliminated by varistor 40.

The circuit also includes a voltage sensing circuit which is connected across the terminals of motor 10. This circuit includes DC voltmeter 42, diode 44, and resistor 46. Diode 44 rectifies the voltage across motor 10 so that voltmeter 42 may be an extremely low cost DC voltmeter, rather than a more expensive AC voltmeter. The purpose of the voltage sensing circuit is to provide a visual indication to the operator of the voltage which appears across motor 10, thereby permitting the operator to select the proper set point for the minimum motor speed.

The motor control circuit shown in the FIGURE provides automatic control of the speed of motor 10 as a function of a sensed condition, such as temperature. Thermistor 48 is a negative temperature coefficient temperature sensor and is connected in a sensing bridge 50 which includes resistors 52 and 54, potentiometer 56, and resistors 58, 60 and 62. Resistor 64 and diode 66 connect terminal 70 of bridge 50 with first conductor 16. Similarly, resistor 72 and diode 74 connect terminal 76 of bridge 50 with second conductor 18. Resistors 52 and 54 and thermistor 48 are connected in a first leg of the bridge circuit between terminal 70 and terminal 78. Potentiometer 56 and resistor 58 form a second leg of the bridge between terminal 70 and terminal 80. Resistor 60 forms a third leg of the bridge between terminal 78 and terminal 76, and resistor 62 forms a fourth leg of the bridge between terminal 80 and terminal 76.

Bridge 50 is normally balanced so that at a predetermined minimum temperature, the potential difference between terminals 78 and 80 is zero. In this state, the bridge is balanced. As temperature increases, the resistance of thermistor 48 decreases, and a potential difference is created between terminals 78 and 80. The amount of unbalance and therefore the amount of potential difference is a function of the temperature sensed by thermistor 48.

Connected between terminals 78 and 80 is a light emitting circuit including resistor 82, light emitting diode 84, and protective diode 86. When the potential difference between terminals 78 and 80 reaches a threshold value, light emitting diode 84 turns on and emits light. As the temperature increases, the light from light emitting diode 84 increases. The motor control circuit of the present invention also includes an additional charging circuit which includes resistors 88 and 90, photosensors 92 and 94, and switch 96. Resistors 88 and 90 form a voltage divider between first and second conductors 16 and 18. Photosensors 92 and 94 are photoconductive sensors which receive light emitted by light emitting diode 84. The conductivity of photosensors 92 and 94, therefore, is controlled by the light emitted by light emitting diode 84. As the conductivity of sensors 92 and 94 increases, and when switch 96 is closed for automatic operation, additional charging current is permitted to flow which increases the rate of charging of the integrating circuit. This decreases the time required for the charge on capacitors 28 and 30 to reach a threshold value which triggers diac 26 and triac 22. In other words, with increasing temperature, charging current to the integrating circuit is increased, thereby causing earlier and earlier firing of triac 22 during each half-cycle. This phase angle change in triggering triac 22 results in greater voltage across the motor 10, and thereby in a higher motor speed.

Initially, the operator sets the minimum speed of the motor 10 by varying potentiometer 34 to produce the charging rate of the integrating circuit which results in the desired minimum speed. This operation is done with switch 96 open, so that the automatic temperature control portion of the circuit does not affect the minimum speed setting. Switch 96 is then closed to connect the additional charging circuit to the integrating circuit and permit automatic operation.

A temperature increase results in an increase in the unbalance of bridge 50, which is sensed by light emitting diode 84, which in turn supplies light signals to photosensors 92 and 94. Depending upon the amoung of light sensed by light sensors 92 and 94, the additional charging current to the integrating circuit is varied. An increase in temperature results in increased charging current, thereby advancing the phase angle at which triac 22 is triggered during each half cycle. This in turn results in an increase in motor speed with increase in temperature.

One important advantage of the motor control circuit of the present invention is that it does not suffer from stalling of motor 10 as thermistor 48 senses higher and higher temperatures. This has been a problem with previous phase angle firing motor control circuits. In one preferred embodiment, in which motor 10 was a 230 volt motor, the motor control circuit of the present invention permitted motor speed control over essentially the entire range of possible motor speeds. In other words, motor 10 could be operated without stalling over a range from about zero to about ninety-eight percent full voltage across motor 10.

Another significant advantage of the present invention is that it is insensitive to the length of sensor lead wires 98 and 100, which connect sensor 48 to bridge 50. In previous motor controls, the length of lead wires affected the operation of the motor control circuit. In some cases, the lead wires could not exceed about six feet without causing stalling of the electric motor. With the present invention, wires 98 and 100 may be as long as five hundred feet without any effect upon the operation of the motor. This is because gate electrode 24 of triac 22 is isolated from thermistor 48. The control signals which vary the phase angle firing of triac 22 are supplied through light emitting diode 84 and photosensors 92 and 94. The length of lead wires 98 and 100 do not affect the firing point of triac 22.

Another important advantage of the present invention is that photosensors 92 and 94 are not directly in series with either triac 22 or motor 10. For that reason, sensors 92 and 94 may have an extremely high dark resistance (e.g. 15 to 50 Mohm) without creating motor stalling problems.

Table 1 is a list of component values of the various components of the circuit shown in FIG. 1. In several cases, alternative sources of the components are listed.

TABLE 1

| | |
|---|---|
| | 1-1HP, 230V, 1-phase permanent split capacitor or shaded pole or 3¼HP, 230V, 1-phase permanent split capacitor or shaded pole |
| Fuse 20 | ABC-15, 15A, 250V |
| Triac 22 | RCA T6420-D 40A, 400V or 600V or GE SC265-D 40A, 400V or 600V |
| Diac 26 | GE St2 32V break over RCA D3202U |
| Capacitors 28, 30, 36 | Sprague 715P47356LD3 .047μF 600V or 400V |
| Resistor 32 | 12K ohm, ½ W, 10% |
| 38 | 360 ohm, ½ W, 10% |
| 46 | 120K ohm, 1W, 10% |
| 52 | 1K ohm, ½ W, 10% |
| 54 | 1K ohm, ½ W, 10% |
| 58 | 12K ohm, 1W, 10% |
| 60 | 47K ohm, 1W, 10% |
| 62 | 47K ohm, 1W, 10% |
| 64 | 820 ohm, 1W, 10% |
| 72 | 18K ohm, 1W, 10% |
| 82 | 1K ohm, 1W, 10% |
| 88 | 47K ohm, 2W, 10% |
| 90 | 47K ohm, 2W, 10% |
| Potentiometer 34 | Allen Bradley 504UA, 500K ohm, 2.25W Allen Bradley 103UA, 10K ohm, 2.25W |
| Varistor 40 | GE V275LA20A |
| Meter 42 | 0-1 mADC, 250V |
| Diodes 44, 66, 74 | Mallory PTC205 2.5A, 1000V P1V |
| Thermister 48 | Keystone RL 2012-5506-120D1 10K ohm at 25° C. |
| LED (Red) 84 | AND-115R |
| Photosensors 92, 94 | GE #1 175MW, 50Mohm Vactec VT833 175MW, 15Mohm |

In conclusion, the present invention is a motor speed control which provides variable speed control over essentially the entire operating range without stalling. The present invention also permits the temperature sensor to be positioned remote from the remainder of the circuit, since the sensor lead lengths do not adversely affect operation of the motor.

Although the present invention has been described with reference to a preferred embodiment, workers skilled in the art will recognize that changes made be made in form and detail without departing from the spirit and scope of the invention.

What is claimed is:

1. A motor control circuit for controlling speed of an AC electric motor as a function of a sensed parameter, the motor control circuit comprising:
    first and second conductor means adapted to be connected to a source of AC voltage;
    integrating circuit means connected between the first and second conductor means and having an output;
    first gated bilateral switch means having first and second main current carrying electrodes and a gate electrode for receiving a signal derived from the output of integrating circuit means, the first and second main current carrying electrodes being connected in series with the AC electric motor between the first and second conductor means;
    condition responsive sensing circuit means for providing a signal which is a function of the sensed parameter;
    light emitting means for emitting light as a function of the signal from the condition responsive means; and
    light responsive charging circuit means for providing charging current to the integrating circuit means as a function of light received from the light emitting means, the light responsive charging circuit comprising:
        voltage divider means connected between the first and second conductor means; and
        photosensor means connected between the voltage divider means and the integrating circuit means.

2. The motor control circuit of claim 1 wherein the sensed parameter is temperature, and wherein an increase in temperature causes an increase in the signals provided by the condition responsive sensing circuit means, an increase in charging current to the integrating circuit means, and an increase in speed of the motor.

3. The motor control circuit of claim 1 wherein the integrating circuit means includes capacitor means and variable resistance means, the variable resistance means being variable to adjust a base rate of integration by the integrating circuit means and thereby a minimum speed of the motor.

4. The motor control circuit of claim 3 wherein the capacitor means and the variable resistance means are connected in parallel with the first and second main current carrying electrodes.

5. The motor control circuit of claim 4 wherein the capacitor means comprises a first capacitor connected between the first conductor means and the second bilateral switch means and a second capacitor having one terminal connected to the first conductor and its other terminal connected through a resistor to the second bilateral switch means.

6. The motor control circuit of claim 1 wherein the light responsive charging circuit means further comprises:
    switch means connected in series with the photosensor means to permit disconnection of the light responsive charging circuit means from the integrating circuit means permit adjustment of a minimum motor speed irrespective of the sensed parameter.

7. The motor control circuit of claim 1 wherein the condition responsive sensing circuit means comprises a sensing bridge having first, second, third and fourth terminals, the first terminal being connected to the first conductor means, the second terminal being connected to the second conductor means, a first leg of the sensing bridge being connected between the first and third terminals, a second leg being connected between the first and fourth terminals, a third leg being connected between the second and third terminals, and a fourth leg being connected between the second and fourth terminals, and wherein a condition responsive sensing element is connected in one of the legs of the bridge.

8. The motor control circuit of claim 7 wherein the light emitting means is connected between the third and fourth terminals of the bridge.

9. The motor control circuit of claim 8 wherein the light emitting means includes a light emitting diode.

10. The motor control circuit of claim 9 wherein the sensor is connected in the first leg of the bridge.

11. The motor control circuit of claim 10 wherein the sensing element is a negative temperature coefficient thermistor and wherein the second, third, and fourth legs of the bridge comprise resistance means.

12. The motor control circuit of claim 1 and further comprising:
    second bilateral switch means connecting the gate electrode of the first gated bilateral switch means and the output of the integrating circuit means.

13. The invention of claim 12 wherein the first gated bilateral switch means comprises a triac and wherein the second bilateral switch means comprises a diac.

14. The motor control circuit of claim 13 and further comprising:
   commutation circuit means connected in parallel with the first and second main current carrying electrodes of the triac; and
   varistor means connected in parallel with the first and second main current carrying electrodes of the triac.

15. The motor control circuit of claim 1 and further comprising:
   voltmeter means for providing a visual indication of voltage across the electric motor.

16. The motor control circuit of claim 1 and further comprising:
   second bilateral switch means connecting the gate electrode of the first gated bilateral switch means and the output of the integrating circuit means.

17. A motor control circuit for controlling speed of an AC electric motor as a function of a sensed parameter, the motor control circuit comprising:
   first gated bilateral switch means having first and second main current carrying electrodes and a gate electrode, the first and second main current carrying electrodes being connected in series with all windings of the AC electric motor;
   integrating circuit means connected in parallel with the first and second main current carrying electrodes and having an output connected to supply a signal to the gate electrode;
   condition responsive sensing circuit means for providing a signal which is a function of the sensed parameter;
   light emitting means for emitting light as a function of the signal from the condition responsive means; and
   light responsive charging circuit means connected to the integrating circuit means for providing charging current to the integrating circuit means as a function of light received from the light emitting means, the light responsive charging circuit means being energized independently of the windings of the electric motor.

* * * * *